US012218467B2

(12) United States Patent
Xiao

(10) Patent No.: US 12,218,467 B2
(45) Date of Patent: Feb. 4, 2025

(54) HIGH-FAULT-TOLERANCE RADIO-FREQUENCY COAXIAL CONNECTOR AND ASSEMBLY

(71) Applicant: RESEARCH ON ELECTRICAL APPLIANCES OF SHANGHAI ASTRONAUTICS CO. LTD, Shanghai (CN)

(72) Inventor: Shunqun Xiao, Shanghai (CN)

(73) Assignee: RESERCH ON ELECTRICAL APPLIANCES OF SHANGHAI ASTRONAUTICS CO. LTD (CN)

(*) Notice: Subject to any disclaimer, the term of this patent is extended or adjusted under 35 U.S.C. 154(b) by 433 days.

(21) Appl. No.: 17/624,657

(22) PCT Filed: Aug. 30, 2019

(86) PCT No.: PCT/CN2019/103752
§ 371 (c)(1),
(2) Date: Jan. 4, 2022

(87) PCT Pub. No.: WO2021/003828
PCT Pub. Date: Jan. 14, 2021

(65) Prior Publication Data

US 2022/0263279 A1 Aug. 18, 2022

(30) Foreign Application Priority Data

Jul. 5, 2019 (CN) ......................... 201910602387.0

(51) Int. Cl.
*H01R 24/44* (2011.01)
*H01R 13/05* (2006.01)
(Continued)

(52) U.S. Cl.
CPC ............. *H01R 24/44* (2013.01); *H01R 13/05* (2013.01); *H01R 13/11* (2013.01); *H01R 13/502* (2013.01); *H01R 13/639* (2013.01)

(58) Field of Classification Search
CPC ........ H01R 24/44; H01R 13/05; H01R 13/11; H01R 13/502; H01R 13/639
(Continued)

(56) References Cited

U.S. PATENT DOCUMENTS 4,494,816 A 1/1985 Tamburro
4,826,450 A 5/1989 Crane et al.
(Continued)

FOREIGN PATENT DOCUMENTS

CN 102299435 A 12/2011
CN 203367599 U 12/2013
(Continued)

OTHER PUBLICATIONS

International Search Report corresponding to PCT/CN2019/103752 dated Mar. 27, 2020.
(Continued)

*Primary Examiner* — Gary F Paumen
(74) *Attorney, Agent, or Firm* — BARNES & THORNBURG LLP

(57) ABSTRACT

A high-fault-tolerance radio-frequency coaxial connector and an assembly. The radio-frequency coaxial connector comprises a radio-frequency plug, a radio-frequency socket coaxially arranged with the radio-frequency plug, and a fixing assembly used for fixing the radio-frequency socket. The radio-frequency plug and the radio-frequency socket are movably connected in a plug-in manner, and plug-in structures between the radio-frequency plug and the radio-frequency socket are arranged at equal intervals. The fixing assembly comprises a fixing plug and a columnar fixing
(Continued)

socket, and a locking structure used for locking the radio-frequency socket is provided between the fixing plug and the fixing socket.

8 Claims, 10 Drawing Sheets

(51) Int. Cl.
*H01R 13/11* (2006.01)
*H01R 13/502* (2006.01)
*H01R 13/639* (2006.01)

(58) Field of Classification Search
USPC .......................................................... 439/578
See application file for complete search history.

(56) References Cited

U.S. PATENT DOCUMENTS

| | | | | |
|---|---|---|---|---|
| 5,116,230 | A | 5/1992 | Dechelette et al. | |
| 5,518,420 | A * | 5/1996 | Pitschi ................. | H01R 24/564 439/825 |
| 5,695,365 | A * | 12/1997 | Kennedy .............. | H01R 24/542 439/578 |
| 6,132,234 | A * | 10/2000 | Waidner ............. | H01R 13/6273 439/578 |
| 6,955,563 | B1 * | 10/2005 | Croan .................... | H01R 24/40 439/578 |
| 7,455,550 | B1 * | 11/2008 | Sykes .................. | H01R 13/506 439/578 |
| 7,481,673 | B1 * | 1/2009 | Qu ..................... | H01R 13/5219 439/578 |
| 7,553,185 | B1 * | 6/2009 | Qu ........................ | H01R 24/40 439/578 |
| 2003/0224656 | A1 | 12/2003 | Yoshida | |
| 2010/0261379 | A1 * | 10/2010 | Blakborn ............... | H01R 13/41 439/578 |
| 2011/0021075 | A1 * | 1/2011 | Orner ................. | H01R 13/6277 439/585 |
| 2013/0072058 | A1 * | 3/2013 | Le Tortorec ....... | H01R 13/2421 439/578 |
| 2013/0102187 | A1 * | 4/2013 | Camelio ................ | H01R 24/50 439/578 |
| 2013/0109210 | A1 * | 5/2013 | Zhang .................... | H01R 24/40 439/271 |

FOREIGN PATENT DOCUMENTS

| | | | |
|---|---|---|---|
| CN | 105281122 | A | 1/2016 |
| CN | 106936008 | A | 7/2017 |
| CN | 206947679 | U | 1/2018 |
| CN | 207896349 | U | 9/2018 |
| EP | 0844699 | A2 | 5/1998 |
| JP | S53111291 | U | 9/1978 |
| JP | S5717580 | A | 1/1982 |
| JP | 2005529449 | A | 9/2005 |

OTHER PUBLICATIONS

First Chinese Office Action corresponding to CN 201910602387.0 dated Feb. 2, 2020.

Chinese Notification to Grant for corresponding CN 20191060238. 7.

Chinese First Search corresponding to CN 2019106023870.

Written Opinion corresponding to PCT/CN2019/103752 dated Mar. 27, 2020.

European Search Report corresponding to EP 19937054.5-1201/ 3979435 dated Jul. 14, 2022.

Japanese Office Action corresponding to Japanese Patent Application 2022-500762 dated Jan. 30, 2023.

European Office Action corresponding to EP 19 937 054.5 -1201 dated Jul. 26, 2022.

European Intention to Grant EP 19 937 054.5 -1201 dated Feb. 12, 2024.

Japanese Intention to Grant 2022-500762 dated Mar. 30, 2023.

* cited by examiner

HIGH-FAULT-TOLERANCE RADIO-FREQUENCY COAXIAL CONNECTOR AND ASSEMBLY

CROSS-REFERENCE TO RELATED APPLICATIONS

The present utility patent application is a national stage application of PCT/CN2019/103752, entitled HIGH-FAULT-TOLERANCE RADIO-FREQUENCY COAXIAL CONNECTOR AND ASSEMBLY, filed on Aug. 30, 2019, the contents of which are hereby incorporated by reference in their entirety, including but without limitation, those portions concerning radio frequency connectors.

TECHNICAL FIELD

The present application relates to a high-fault-tolerance radio-frequency coaxial connector and an assembly, belonging to the technical field of radio-frequency coaxial connectors.

BACKGROUND ART

The radio-frequency coaxial connector is generally regarded as a device attached to a cable or installed on an instrument, as a device for electrically connecting or separating transmission lines.

During the use of the existing radio-frequency coaxial connector, if the radio-frequency plug and the radio-frequency socket are not plugged in place, that is, an error exists between the actual plug-in position of the radio-frequency plug and the radio-frequency socket and the complete plug-in position of the radio-frequency plug and the radio-frequency socket. For example, as for a single radio-frequency transmission line, the radio-frequency coaxial connector is mainly in the incomplete plugging, so that the impedance at the radio-frequency coaxial connector can reach 70~80Ω. For example, if there is an error of 3 mm between the actual plug-in position and the complete plug-in position of the radio-frequency coaxial connector, then the impedance at the radio-frequency coaxial connector can reach 80Ω, which is far greater than 50Ω. A skin effect exists in high-frequency high-speed lines. In the industry, it has long been proven that when the impedance is 50Ω, the loss for the skin effect is smallest. In terms of electrical performances, the dielectric thickness required for 50Ω impedance is 3~4MIL, which can also effectively reduce interference. Because the dielectric thickness is small, the smaller the distance between the signal and the reference plane is, the smaller the interference to adjacent signals is.

Therefore, during the use of the existing radio-frequency coaxial connector, the radio-frequency plug and the radio-frequency socket must be in completely plug-in connection, otherwise the signal transmission will be easily affected. However, in high-frequency high-speed lines, radio-frequency transmission lines are usually in large numbers and distributed in arrays, such that a plurality of radio-frequency coaxial connectors are usually integrated. The radio-frequency plug and radio-frequency socket in a single radio-frequency coaxial connector are easy to be completely plugged. However, when plug-in operation for a plurality of radio-frequency coaxial connectors are performed at the same time, the phenomenon easy to happen is that the radio-frequency plugs and the radio-frequency sockets in several radio-frequency coaxial connectors are not completely plugged, which makes it necessary to carry out multiple times of debugging, adjustments, re-plugging and other operations in the future. Not only the operation is troublesome, but also it is easy to cause damage to the signal transmission.

SUMMARY

In view of the deficiencies in the prior art, the present application provides a high-fault-tolerance radio-frequency coaxial connector and an assembly. The specific technical solutions are as follows.

A high-fault-tolerance radio-frequency coaxial connector comprises a radio-frequency plug, a radio-frequency socket coaxially arranged with the radio-frequency plug, and a fixing assembly for fixing the radio-frequency socket, wherein the radio-frequency plug and the radio-frequency socket are movably linked in a plug-in manner, wherein a plug-in structure between the radio-frequency plug and the radio-frequency socket is of an equal-interval arrangement; and the fixing assembly comprises a fixing plug and a columnar fixing socket, and a locking structure for locking the radio-frequency socket is arranged between the fixing plug and the fixing socket.

As a further optimized and improved technical solution based on the above technical solution, the radio-frequency plug comprises a tubular plug outer conductor, the plug outer conductor is provided therein with a plurality of first conductor plates along an axial direction of the plug outer conductor, an inside edge of each of the first conductor plates is integrally connected with the plug outer conductor, an outside edge of the first conductor plate is arranged inside the plug outer conductor, a second conductor plate is fixedly provided at a central axis of the plug outer conductor, a gap is provided between an outside wall of the second conductor plate and an inside wall of the plug outer conductor; and the radio-frequency socket comprises a tubular socket shell, and a first slot matched with the first conductor plate is provided at an front end of the socket shell, a tuning fork-shaped socket inner conductor is provided at a center axis of the socket shell, and a second slot matched with the second conductor plate is provided at a head end of the socket inner conductor.

As a further optimized and improved technical solution based on the above technical solution, the first conductor plates are provided in number of two, and central axes of the two first conductor plates and a central axis of the second conductor plate are coplanar with each other.

As a further optimized and improved technical solution based on the above technical solution, a width direction of the second conductor plate and a width direction of the socket inner conductor are perpendicular to each other.

As a further optimized and improved technical solution based on the above technical solution, the fixing plug comprises an insulating tube body sleeved outside the socket inner conductor, a plurality of elastic sheets are provided outside of a middle section of the insulating tube body, a tail end of each of the elastic sheets and the insulating tube body are connected integrally, a spacing is provided between a head end of each of the elastic sheets and an outside wall of the insulating tube body, and an included angle between a length direction of the elastic sheets and a length direction of the insulating tube body is α, and a is an acute angle; a plurality of convex plates are provided at a rear section of the insulating tube body, the head ends of the elastic sheets are arranged between the tail ends of the elastic sheets and head ends of the convex plates, a bump is provided outside of the tail end of each of the convex plates, a spacing is provided between a front end of the bump and the head end of the convex plate; and a hole channel for allowing the radio-frequency socket to be installed is provided at a head end of the fixing socket, the hole channel comprises a first mounting hole for allowing the bump to enter and exit, a second mounting hole for allowing the convex plate to enter and exit, and a third mounting hole adapted to the elastic sheet, a fourth mounting hole is provided at the tail end of the fixing socket, the second mounting hole is provided between the first mounting hole and the third mounting hole, the third mounting hole is in communication with the fourth mounting hole, aperture of the first mounting hole is larger than that of the second mounting hole, and aperture of the third mounting hole is larger than that of the second mounting hole.

As a further optimized and improved technical solution based on the above technical solution, value of $\alpha$ satisfies $6° \leq \alpha \leq 30°$.

As a further optimized and improved technical solution based on the above technical solution, two bumps are provided, two convex plates are provided, and two elastic sheets are provided, wherein an plane where the two bumps are located is coplanar with a plane where the two convex plates are located, and the plane where the two convex plates are located is coplanar with a plane where the two elastic sheets are located.

As a further optimized and improved technical solution based on the above technical solution, number of the first conductor plates is at least three, and the first conductor plates are symmetrically arranged inside the plug shell.

A high-fault-tolerance radio-frequency coaxial connector assembly comprises a plurality of the high-fault-tolerance radio-frequency coaxial connectors, wherein the high-fault-tolerance radio-frequency coaxial connectors are arranged in an array.

The beneficial effects of the present application are as follows.

1) When the radio-frequency plug and the radio-frequency socket in a single radio-frequency coaxial connector are plugged in, even if the radio-frequency plug and the radio-frequency socket are not plugged in place, the error between the actual plug-in position of the radio-frequency plug and the radio-frequency socket and the complete plug-in position of the radio-frequency plug and the radio-frequency socket is within 3 mm. The impedance change between the radio-frequency plug and the radio-frequency socket is small, and the signal transmission is almost free from interference. The radio-frequency coaxial connector has high fault tolerance and is suitable for large-scale synchronization application.

2) As for the radio-frequency coaxial connector assembly composed of a plurality of radio-frequency coaxial connectors, even if some radio-frequency plugs and the radio-frequency sockets are not completely plugged in during the plugging operation, it does not matter as long as the plug-in error is controlled as being less than 3 mm, which significantly reduces the difficulty of operations, such as, plugging and unplugging and debugging the radio-frequency coaxial connector assembly, and can effectively improve the work efficiency; and makes it have a wide range of application prospects and important application values in high-tech fields, such as electronic information, etc.

DETAILED DESCRIPTION OF EMBODIMENTS

Figure 1:
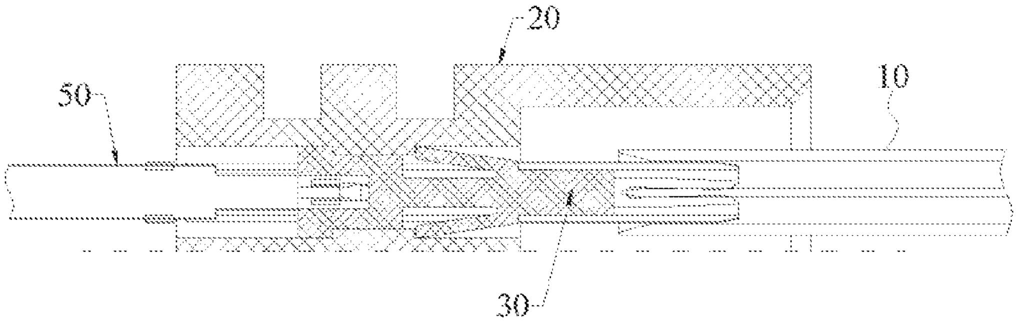
FIG. 1 is a schematic structural diagram of a single high-fault-tolerance radio-frequency coaxial connector according to Embodiment 1 of the present application.
Figure 2:
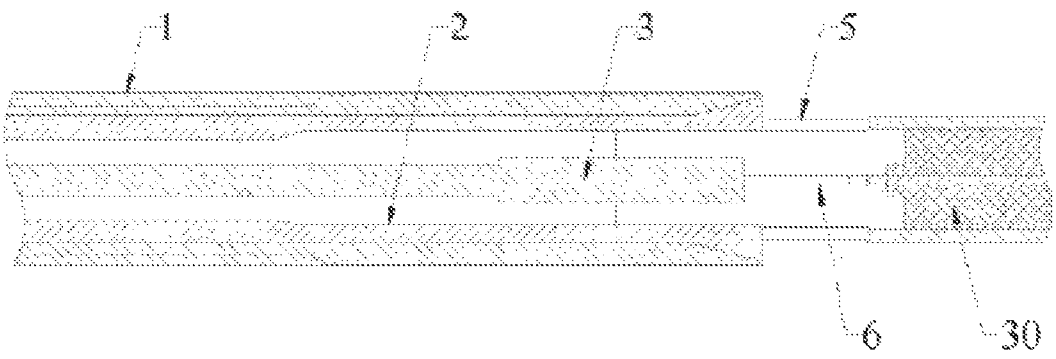
FIG. 2 is a schematic diagram of the connection between the radio-frequency plug and the radio-frequency socket according to Embodiment 1 of the present application.
Figure 3:
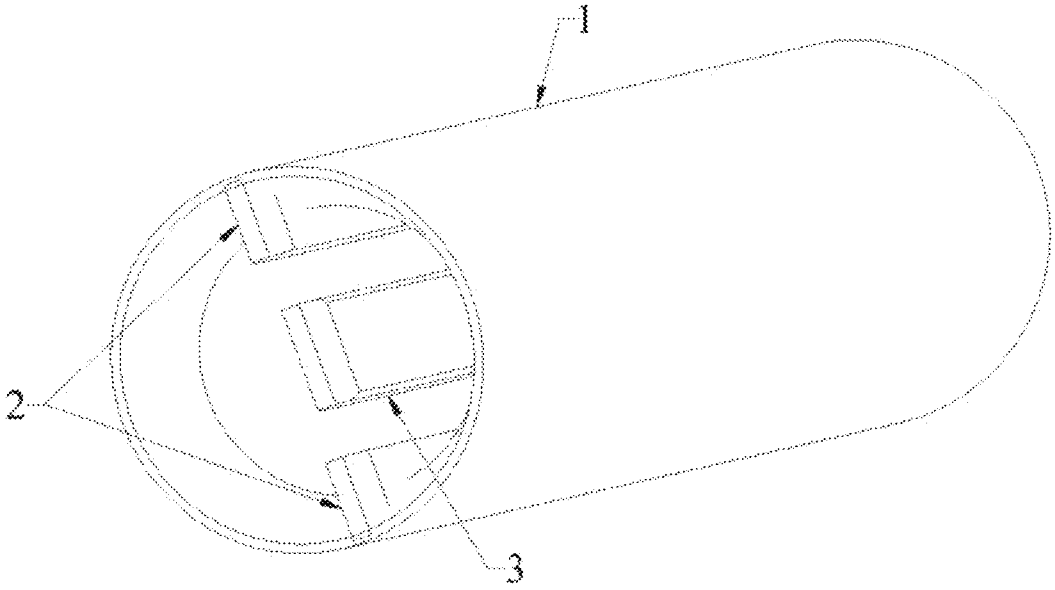
FIG. 3 is a schematic structural diagram of the radio-frequency plug according to Embodiment 1 of the present application.
Figure 4:
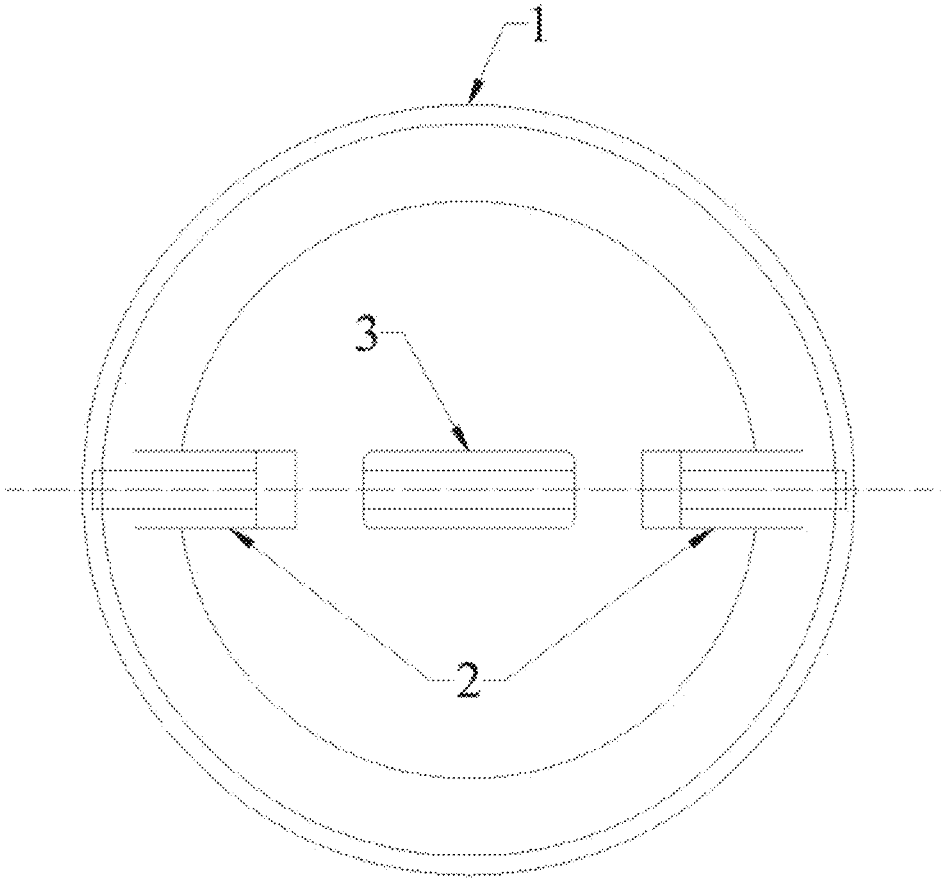
FIG. 4 is a schematic structural diagram (in front view state) of the radio-frequency plug according to Embodiment 1 of the present application.
Figure 5:
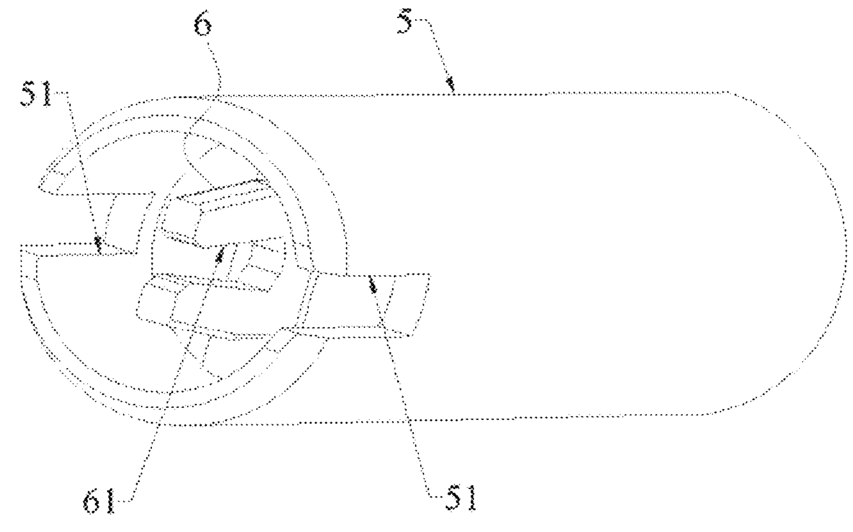
FIG. 5 is a schematic structural diagram of the radio-frequency socket according to Embodiment 1 of the present application.

In order to make the objectives, technical solutions, and advantages of the present application clearer, the present application is further described as follows in detail with reference to the drawings and embodiments. It should be understood that the specific embodiments described here are only used to explain the present application, but not intended to limit the present application.

In the description of the present application, it should be noted that, unless otherwise stated, "plurality" means two or more; orientations or positional relations, indicated by the terms "upper", "lower", "left", "right", "inside", "outside", "front end", "rear end", "head part", "tail part" and the like, are based on the orientation or positional relation shown in the drawings, which is only used for obtaining the convenience of describing the present application and simplifying the description, rather than indicating or implying that the pointed device or element must be in the specific orientation, or be constructed and operated in the specific orientation, and therefore they cannot be understood as a limitation to the present application. In addition, the terms "first", "second", "third", and etc. are only used for the purpose of description, and cannot be understood as indicating or implying the importance of relativity.

In the description of the present application, it should be noted that the terms, "install", "link", and "connect" should be understood in a broad sense unless otherwise clearly specified and limited. For example, it can be the fixed connection or detachable connection, or the integral connection. It can be a mechanical connection or an electrical connection. It can be a direct connection or an indirect connection through an intermediate medium. It can be the internal communication between two devices. For those ordinarily skilled in the art, the specific meaning of the above-mentioned terms in the present application can be understood in specific situations.

As shown in FIG. 1, the high-fault-tolerance radio-frequency coaxial connector comprises a radio-frequency plug 10, a radio-frequency socket 50 coaxially arranged with the radio-frequency plug 10, and a fixing assembly for fixing the radio-frequency socket 50. The radio-frequency plug 10 and the radio-frequency socket 50 are movably linked in a plug-in manner. The plug-in connection structure between the radio-frequency plug 10 and the radio-frequency socket 50 is of the equal interval arrangement. The fixing assembly comprises a fixing plug 30 and a columnar fixing socket 20. A locking structure for locking the radio-frequency socket 50 is arranged between the fixing plug 30 and the fixing socket 20.

As shown in FIGS. 1 to 7, the radio-frequency plug 10 comprises a tubular plug outer conductor 1. A plurality of first conductor plates 2 are arranged inside the plug outer conductor 1 along the axial direction of the plug outer conductor 1. The first conductor plate 2 is a plate-shaped conductor. The inside edge of the first conductor plate 2 is connected integrally to the plug outer conductor 1. The outside edge of the first conductor plate 2 is arranged inside the plug outer conductor 1. The inside edge of the first conductor plate 2 is the side of the first conductor plate 2 that is connected to the plug outer conductor 1, and the outside edge of the first conductor plate 2 is the side opposite to the inside edge of the first conductor plate 2. The second conductor plate 3 is fixedly provided at the central axis of the plug outer conductor 1. The second conductor plate 3 is also a plate-shaped conductor, and the second conductor plate 3 is arranged coaxially with the plug outer conductor 1. The second conductor plate 3 is arranged inside the plug outer conductor 1, and a gap is provided between the outside wall of the second conductor plate 3 and the inside wall of the plug outer conductor 1. The radio-frequency socket 50 comprises a tubular socket shell 5. The front end of the socket shell 5 is provided with a first slot 51 matched with the first conductor plate 2. A tuning fork-shaped socket inner conductor 6 is provided at the center axis of the socket shell 5. The tuning fork shape is similar to a Y-shaped structure. The head end of the socket inner conductor 6 is provided with a U-shaped second slot 61 matched with the second conductor plate 3.

Figure 6:
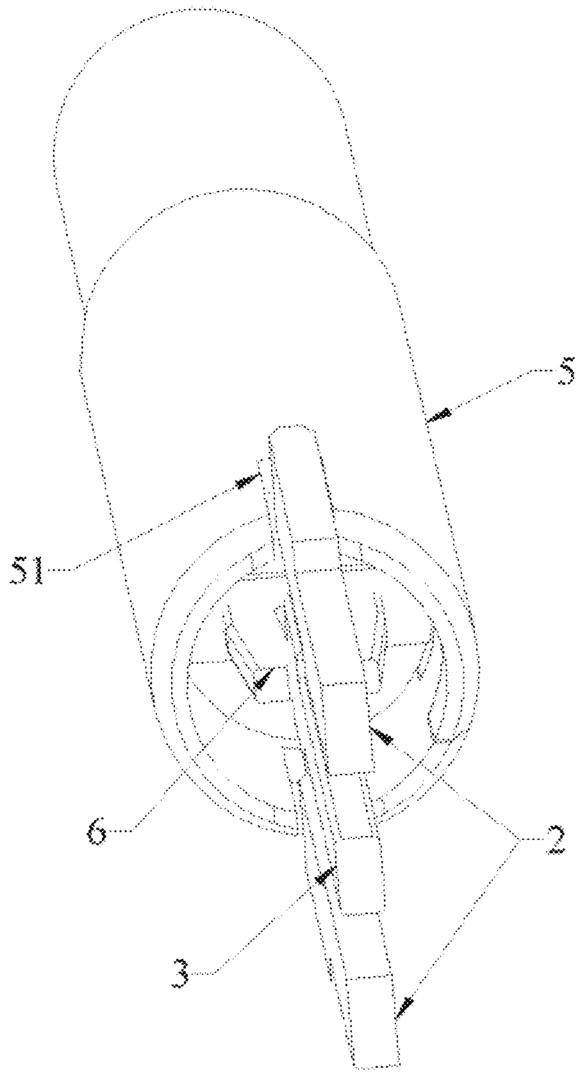
FIG. 6 is a schematic diagram of the connection of the first conductor plate, the second conductor plate and the radio-frequency socket according to the Embodiment 1 of the present application.
Figure 7:
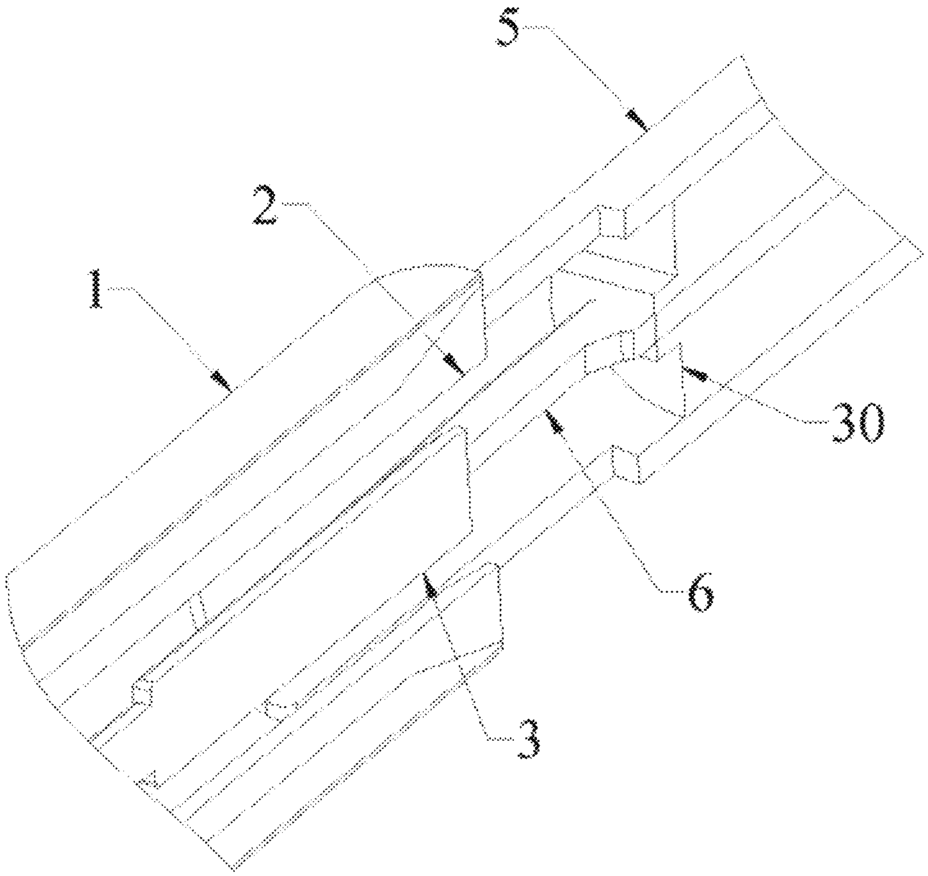
FIG. 7 is a schematic diagram of the radio-frequency plug and the radio-frequency socket being plugged in, according to Embodiment 1 of the present application.
Figure 8:
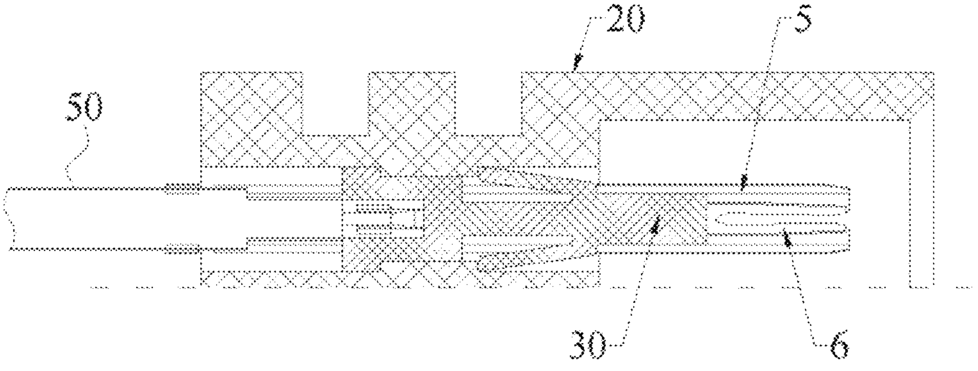
FIG. 8 is a schematic structural diagram of the fixing assembly according to Embodiment 1 of the present application.
Figure 9:
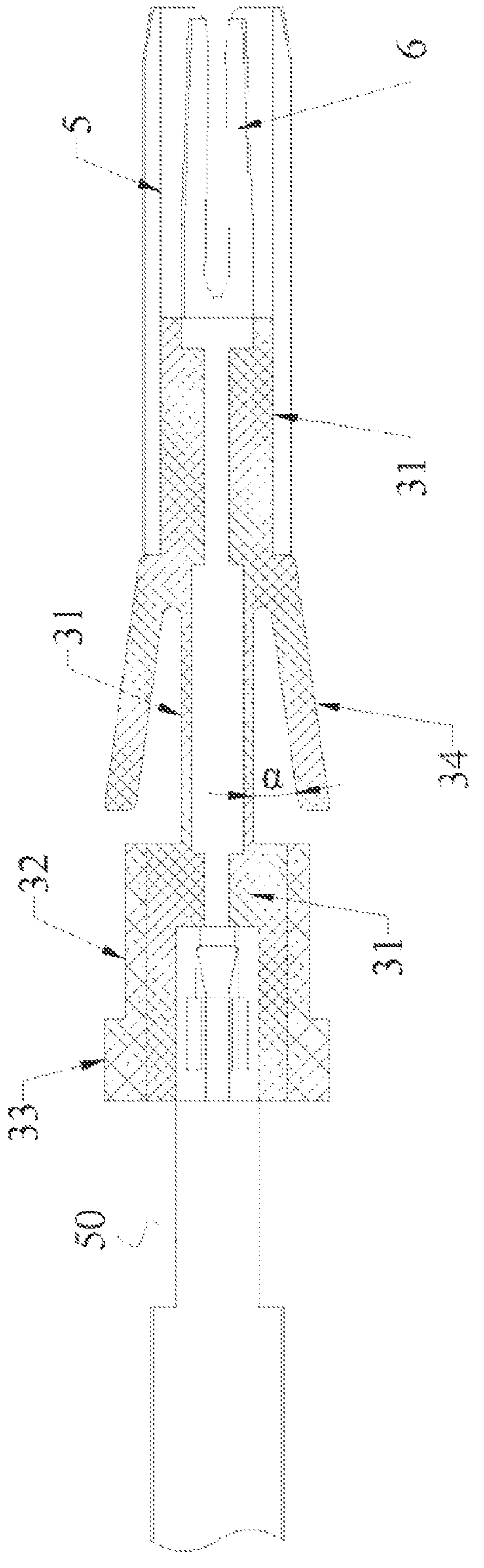
FIG. 9 is an internal schematic diagram when the fixing plug is connected to the radio-frequency socket, according to Embodiment 1 of the present application.
Figure 10:
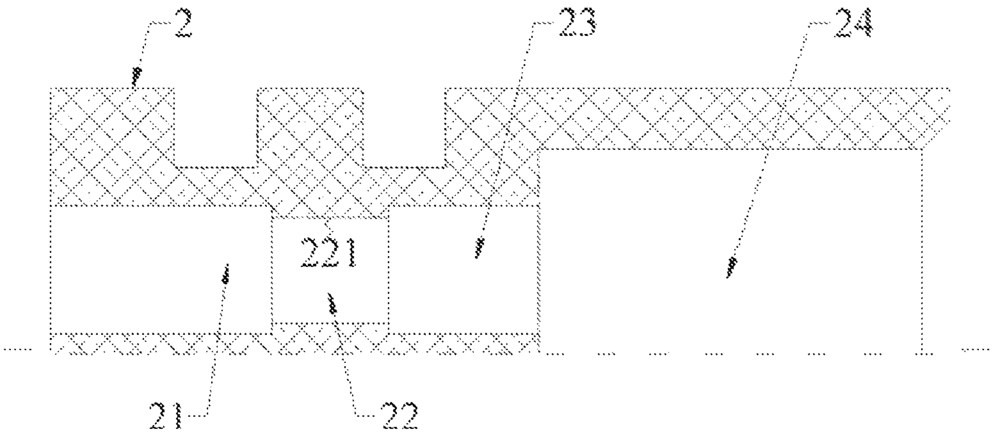
FIG. 10 is a schematic structural diagram of the fixing socket according to Embodiment 1 of the present application.
Figure 11:
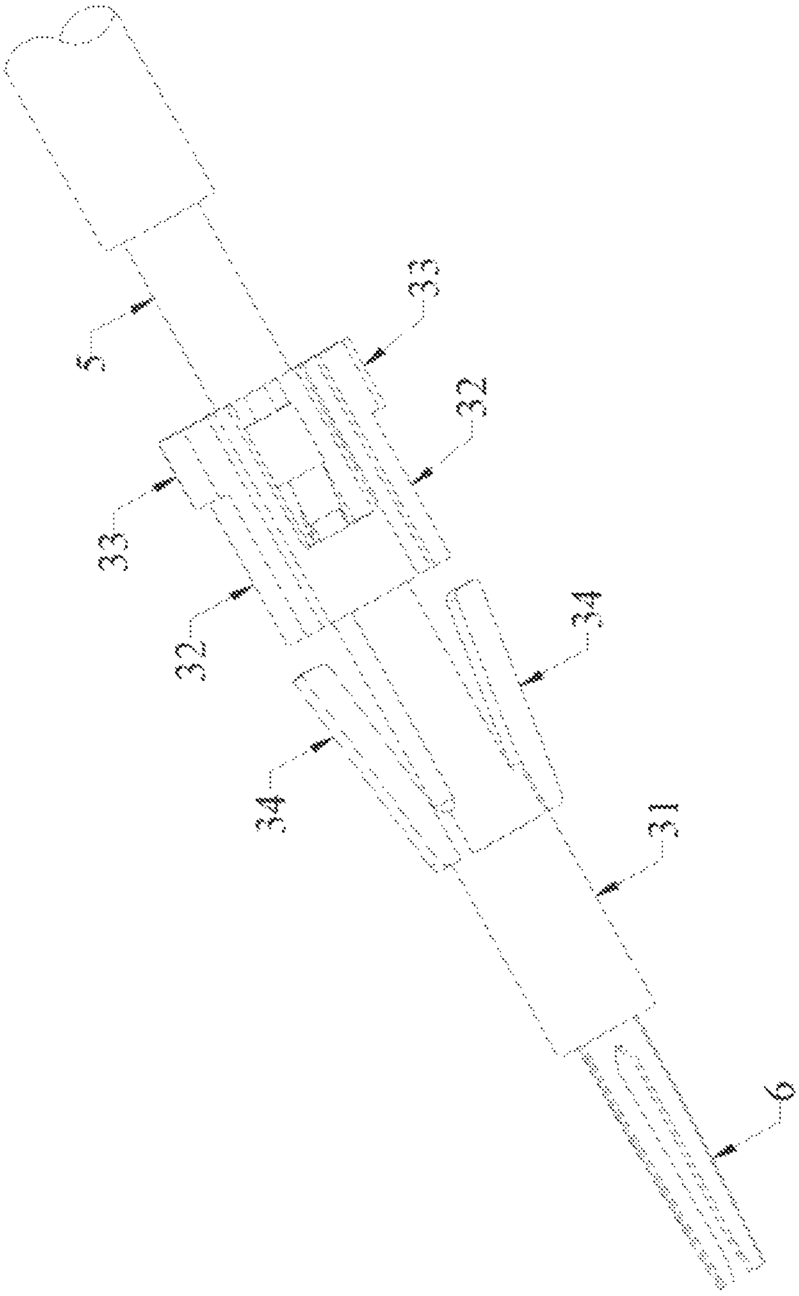
FIG. 11 is a schematic diagram of the connection between the socket inner conductor and the fixing plug according to Embodiment 1 of the present application.
Figure 12:
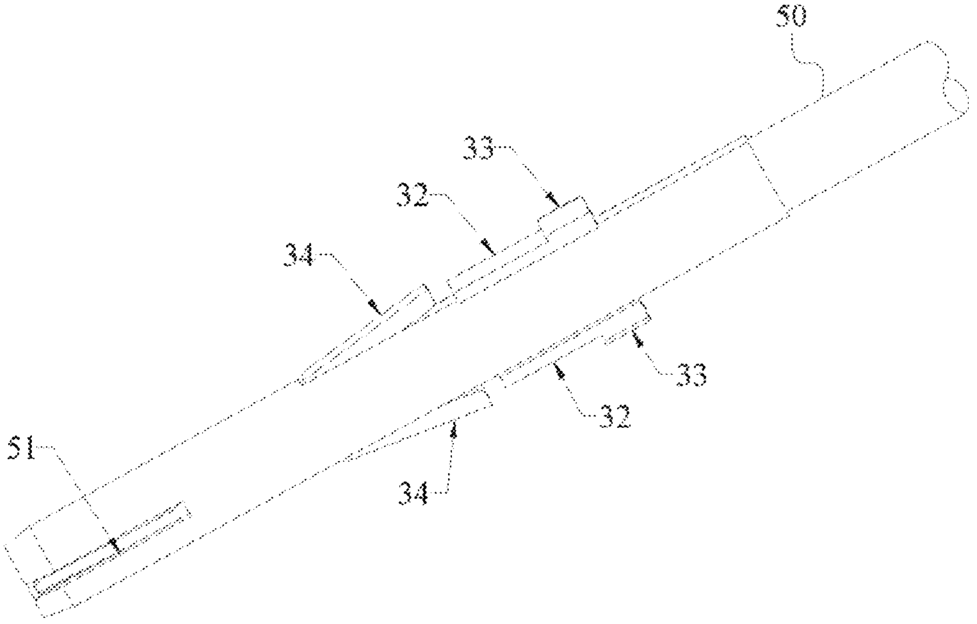
FIG. 12 is a schematic diagram of the connection between the radio-frequency socket and the fixing plug according to Embodiment 1 of the present application.

When the radio-frequency plug 10 is plugged in the radio-frequency socket 50, that is, the front end of the radio-frequency plug 10 is plugged into the front end of the radio-frequency socket 50, at this time, the first conductor plate 2 will be plugged into the first slot 51, and meanwhile, the second conductor plate 3 is plugged into the U-shaped second slot 61 in the tuning fork-shaped socket inner conductor 6, and the front end of the socket shell 5 is plugged into the plug inner conductor 4, as shown in FIGS. 6 and 7. In the above process, the socket shell 5 is an outer conductor, and the socket shell 5 is in contact with the plug inner conductor 4 to be electrically connected. The first conductor plate 2 is in contact with the socket shell 5 to be electrically connected. The first conductor plate 2 is also electrically connected to the plug inner conductor 4. Therefore, the plug inner conductor 4, the socket shell 5, and the first conductor plate 2 are electrically connected to each other. The second conductor plate 3 is fixedly installed inside the plug inner conductor 4, the second conductor plate 3 does not contact the plug inner conductor 4, the second conductor plate 3 is electrically connected to the socket inner conductor 6, and the socket inner conductor 6 is separated from the socket shell 5 by an insulated column 7. Therefore, the second conductor plate 3 and the socket inner conductor 6 are electrically connected with each other, to form the first parallel plate in the parallel plate capacitor. The socket shell 5, the first conductor plate 2 and the plug inner conductor 4 are electrically connected to each other, to form the second parallel plate of the parallel plate capacitor. According to the formula of the parallel plate capacitance, it can be known that the relationship between the capacitance C and the direct facing area S of the polar plates and the relationship between the capacitance C and the distance d of the polar plates are following: the capacitance C is positively proportional to the S, and the capacitance C is the inversely proportional to the d. In the process of making the radio-frequency plug 10 and the radio-frequency socket 50 plugged into each other, when the radio-frequency plug 10 and the radio-frequency socket 50 are completely plugged, the end portion of the second conductor plate 3 is plugged into the bottom of the second slot 61, which is regarded as standard; and when they are not plugged in place, the end portion of the second conductor plate 3 does not contact the bottom of the second slot 61. At this time, even if being not completely contacted, there is a gap between the end portion of the second conductor plate 3 and the bottom of the second slot 61, when the gap does not exceed 3 mm, due to the matching structure of the second conductor plate 3 and the socket inner conductor 6 and the matching structure of the socket shell 5, the first conductor plate 2 and the plug inner conductor 4, the socket shell 5 and the plug inner conductor 4 are shaped as a round pipe, and moreover the width direction of the second conductor plate 3 and the width direction of the socket inner conductor 6 are perpendicular to each other, after the second conductor plate 3 is inserted to the second slot 61 in the socket inner conductor 6, the projections, which are projected by the second conductor plate 3 and the socket inner conductor 6 onto the axial direction of the second conductor plate 3 or the axial direction of the socket inner conductor 6, are cross-shaped, that is, in the parallel plate capacitor C composed of the first parallel plate and the second parallel plate, the first conductor plate 2, the second conductor plate 3, the socket inner conductor 6 are arranged at equal spacing from the socket shell 5 and the plug inner conductor 4. The direct facing area S of the polar plate is always in a fixed and constant state. The distance d of the polar plates is ultimately determined by the cross-shaped structure between the second conductor plate 3 and the socket inner conductor 6. In this structure, the polar plate distance d between the second conductor plate 3 and the socket inner conductor 6 has a small change, and the change of the capacitance C is very small. Finally, change of the impedance between the radio-frequency plug 10 and the radio-frequency socket 50 is not large, and the signal transmission loss is small.

Further, in order to facilitate the plug-in connection, the inner wall of the front end of the plug inner conductor 4 is provided with an inner conical-surface structure, and the inner wall of the front end of the socket shell 5 is provided with an outer conical-surface structure. The front end of the plug inner conductor 4 is the end which is plugged in and connected with the radio-frequency plug 10; and in the same way, the front end of the socket shell 5 is the end which is plugged in and connected with the radio-frequency socket 50.

Further, in order to facilitate the plug-in connection, the second conductor plate 3 and the second slot 61 are in a clearance fit therebetween. The first conductor plate 2 and the first slot 51 are in a clearance fit therebetween.

Further, the front end of the socket shell 5 and the front end of the plug inner conductor 4 are in an interference fit therebetween.

In this embodiment, the number of the first conductive plates 2 is set as two. The central axes of the two first conductive plates 2 and the central axis of the second conductive plate 3 are coplanar with each other. In the same way, since the first conductor plates 2 are in one-to-one correspondence to the first slots 51, and the second conductor plates 3 are in one-to-one correspondence to the second slots 61. The number of the first slots 51 is set as two. The central axes of two first slots 51 and the central axis of the second slot 61 are coplanar with each other. With the above arrangement, on one hand, it makes the radio-frequency plug 10 and the radio-frequency socket 50 more convenient to be plugged in, and on the other hand, it is helpful to further reduce the change of the polar plate distance d.

As shown in FIGS. 1, 8, 9, 10, 11, and 12, the fixing plug 30 comprises an insulating tube body 31 sleeved outside the socket inner conductor 6, and the insulating tube body 31 is fixedly connected to the socket inner conductor 6. A plurality of elastic sheets 34 are provided outside of the middle section of the insulating tube body 31. The tail end of the elastic sheet 34 is integrally connected to the insulating tube body 31. A spacing is provided between the head end of the elastic sheet 34 and the outside wall of the insulating tube body 31. The included angle between the length direction of the elastic sheet 34 and the length direction of the insulating tube body 31 is α, and a is an acute angle. The rear section of the insulating tube body 31 is provided with a plurality of convex plates 32. The head end of elastic sheet 34 is arranged between the tail end of the elastic sheet 34 and the head end of the convex plate 32. A bump 33 is provided outside of the tail end of the convex plate 32. A spacing is provided between the front end of the bump 33 and the head end of the convex plate 32. The bump 33 and the convex plate 32 form an L-shaped step structure. The head end of the fixing socket 20 is provided with a hole channel for allowing the radio-frequency socket 50 to be installed. At least one hole channel is provided. The hole channel comprises the first mounting hole 21 for allowing the bump 33, the convex plate 32, as well as the insulating tube body 31 to enter and exit, the second mounting hole 22 for allowing the convex plate 32 and the insulating tube body 31 to enter and exit, and the third mounting hole 23 matched with the elastic sheets 34. The first mounting hole 21, the second mounting hole 22, and the third mounting hole 23 are coaxially arranged and communicate with each other. The tail end of the fixing socket 2 is provided with a fourth mounting hole 24, and one fourth mounting hole 24 is provided. If a plurality of hole channels are provided, the plurality of hole channels are each communicated to the fourth mounting hole 24. The second mounting hole 22 is provided between the first mounting hole 21 and the third mounting hole 23, and the third mounting hole 23 is communicated to the fourth mounting hole 24. The aperture of the first mounting hole 21 is greater than the aperture of the second mounting hole 22, and the aperture of the third mounting hole 23 is greater than the aperture of the second mounting hole 22.

Each of the insulating tube body 31, the convex plate 32, the bump 33 and the elastic sheet 34 is integrally formed and made of insulating plastic. The fixing plug 3 is made of insulating material, which can prevent the electricity leakage of the socket inner conductor 6, or avoid that it is electrically connected with other electrical devices to affect the signal transmission. The aperture of the first mounting hole 21 is equal to that of the third mounting hole 23.

In this embodiment, the fixing plug 3 is fixedly connected to the radio-frequency socket 50. During the process of plugging the fixing plug 3 into the fixing socket 2, first, the front end of the radio-frequency socket 50 passes through the first mounting hole 21, the second mounting hole 22, the third mounting hole 23 and the fourth mounting hole 24, sequentially. Further, the aperture of the fourth mounting hole 24 is larger than the aperture of the third mounting hole 23, and the aperture of the fourth mounting hole 24 is large enough to facilitate the subsequent plug-in connection of the radio-frequency socket 50 and the radio-frequency plug 10. During the process of the front end of the radio-frequency socket 50 sequentially passing through the first mounting hole 21, the second mounting hole 22, the third mounting hole 23, and the fourth mounting hole 24, the elastic sheet 34 will also pass through the first mounting hole 21, the second mounting hole 22 and the third mounting hole 23 sequentially. In this embodiment, when the elastic sheet 34 is subjected to an external force, the value of α is 12°. The head end of the elastic sheet 34, during the process of passing through the first mounting hole 21, will not be squeezed by the hole wall of the first mounting hole 21. During the process of the head end of the elastic sheet 34 passing through the second mounting hole 22, the hole wall of the second mounting hole 22 will squeeze the head end of the elastic sheet 34 so that the spacing between the head end of the elastic sheet 34 and the outside wall of the insulating tube body 31 becomes smaller, and the value of α decreases to 6°. Finally, the elastic sheet 34 will enter the inside of the third mounting hole 23, and the aperture of the third mounting hole 23 is larger than the aperture of the second mounting hole 22. The elastic sheet 34, which is restrained, will expand, so that the head end of the elastic sheet 34 abuts tightly against the hole wall of the third mounting hole 23, and at this time, the value of α becomes 8°. Further, the a value satisfies 6°≤α≤30°, α cannot be too large, otherwise the resistance to the elastic sheet 34 when advancing will increase sharply, and α cannot be too small, otherwise the elastic sheet 34 cannot produce enough elastic force to abut against the hole wall of the third mounting hole 23. In addition, the plane at which the junction between the second mounting hole 22 and the third mounting hole 23 is located is parallel to the head end face of the elastic sheet 34, which makes the head end of the elastic sheet 34 also simultaneously abut against the step at the junction between the second mounting hole 22 and the third mounting hole 23, and this structure has the effect of stopping the backing. When the radio-frequency socket 50 and the radio-frequency plug 10 have been plugged in, it can effectively avoid the separation between the radio-frequency socket 50 and the radio-frequency plug 10, and ensure that the radio-frequency socket 50 and the radio-frequency plug 10 are always in a complete plug-in status.

Since the aperture of the first mounting hole 21 is larger than the aperture of the second mounting hole 22, the aperture of the third mounting hole 23 is greater than the aperture of the second mounting hole 22, and the first mounting hole 21, the second mounting hole 22, and the third mounting hole 23 are all arranged coaxially, a convex structure 221 is formed at the second mounting hole 22, and the convex structure 221 is located between the first mounting hole 21 and the third mounting hole 23. After the fixing plug 3 and the fixing socket 2 are completely plugged, the elastic sheet 34 is located at the front of the convex structure 221, and the bump 33 is located at the rear of the convex structure 221. The convex structure 221 is just stuck between the bump 33 and the elastic sheet 34. When stopped by the convex structure 221, the bump 33 can no longer move forward, and at the same time, the elastic sheet 34 will abut against the convex structure 221. The convex structure 221 plays a role of limiting the position, so as to ensure that the fixing plug 3 and the fixing socket 2 are completely plugged in, and the fixing plug 3 and the fixing socket 2 which are plugged in are not easily separated. The fixing plug 3 and the fixing socket 2 are in a locked state.

Further, in order to facilitate the integral molding of the bump 33 and the convex plate 32, the rear end face of the bump 33 is flush with the tail end face of the convex plate 32.

Further, provided are two bumps 33, two convex plates 32, and two elastic sheets 34. The plane where the two bumps 33 are located is coplanar with the plane where the two convex plates 32 are located. The plane where the two convex plates 32 are located is coplanar with the plane where the two elastic sheets 34 are located. The bumps 33, the convex plates 32 and the elastic sheets 34 are all provided in the number of two. On the one hand, it is for the purpose of reducing the production cost; and on the other hand, the coplanar arrangement is to reduce the difficulty of plugging in.

Embodiment 2

Figure 13:
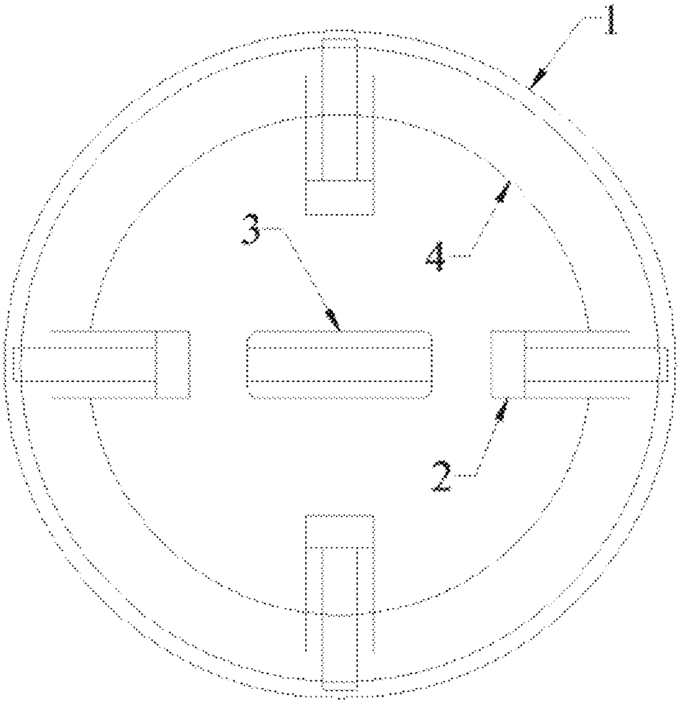
FIG. 13 is a schematic structural diagram (in front view state) of the radio-frequency plug according to Embodiment 2 of the present application.

The difference between this embodiment and Embodiment 1 is that: as shown in FIG. 13, the number of the first conductor plates 2 is set as four, and the first conductor plates 2 are symmetrically arranged inside the plug shell 1. Similarly, the number of first slots 51, in one-to-one correspondence to the first conductor plates 2, is also four.

Embodiment 3

Figure 14:
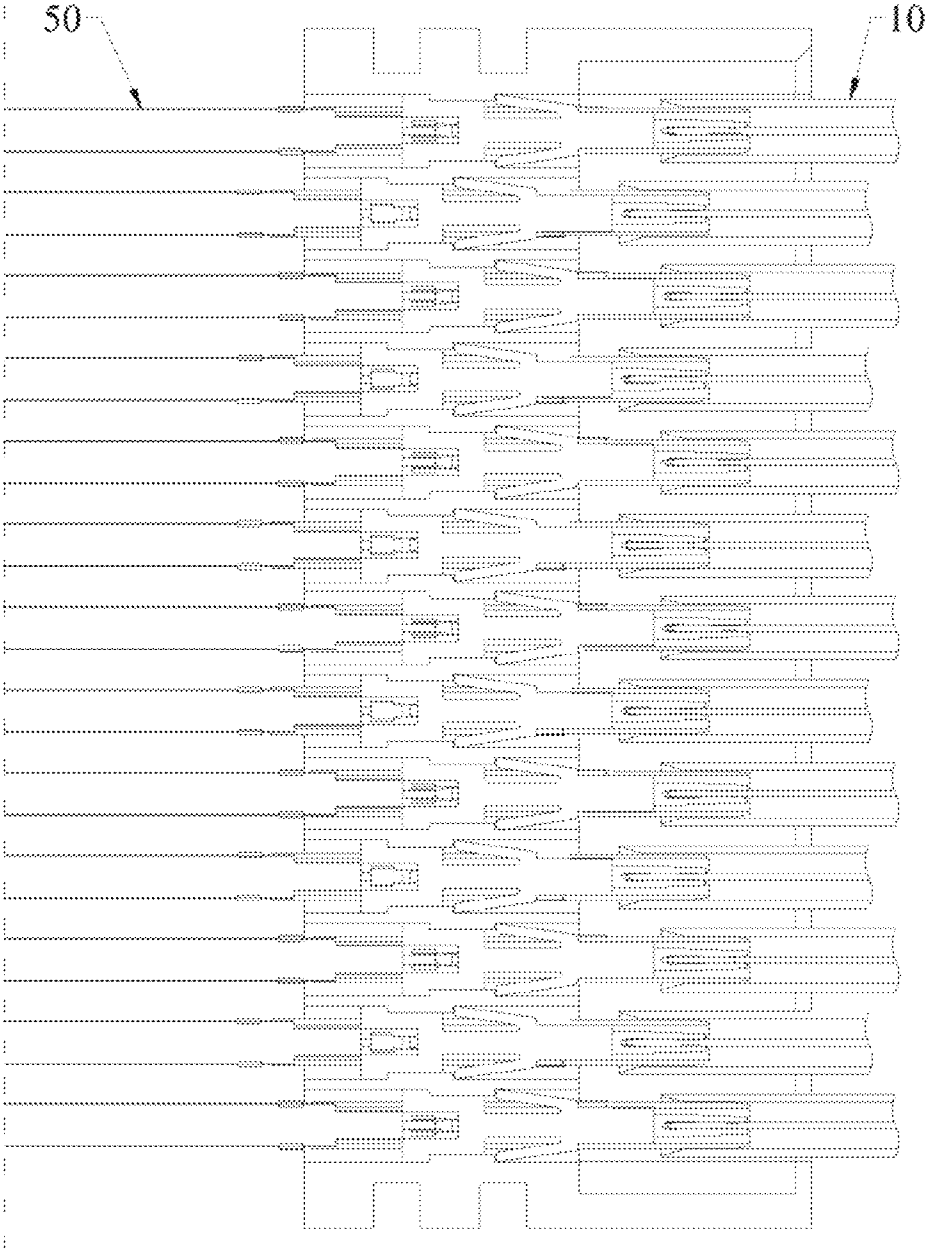
FIG. 14 is a schematic structural diagram of a high-fault-tolerance radio-frequency coaxial connector assembly according to Embodiment 3 of the present application.

A high-fault-tolerant radio-frequency coaxial connector assembly comprises a plurality of high-fault-tolerant radio-frequency coaxial connectors as described in Embodiment 1 or Embodiment 2, and the high-fault-tolerant radio-frequency coaxial connectors are arranged in an array, as shown in FIG. 14.

In the above embodiment, when the radio-frequency plug 10 and the radio-frequency socket 50 are plugged in, since the plug-in structure between the radio-frequency plug 10 and the radio-frequency socket 50 is of the equal interval arrangement, the plug-in structure between the radio-frequency plug 10 and the radio-frequency socket 50 is composed of the first conductor plate 2, the second conductor plate 3, the plug inner conductor 4, the socket inner conductor 6, the second slot 61, the first slot 51, even if the radio-frequency plug 10 is plugged in the radio-frequency socket 50 not in place, for example, even if in the present application the error between the actual plug-in position of the radio-frequency plug 10 and the radio-frequency socket 50 and the complete plug-in position of the radio-frequency plug 10 and the radio-frequency socket 50 reaches 3 mm, the impedance between the radio-frequency plug 10 and the radio-frequency socket 50 is 50±0.5Ω. That is to say, in the present application the error between the actual plug-in position of the radio-frequency plug 10 and the radio-frequency socket 50 and the complete plug-in position of the radio-frequency plug 10 and the radio-frequency socket 50 is 0~3 mm, and the impedance change between the radio-frequency plug 10 and the radio-frequency socket 50 is ±0.5Ω. The impedance change is very small, which can significantly reduce interference. Therefore, when the radio-frequency coaxial connector of the present application is used in large-scale application to produce a radio-frequency coaxial connector assembly, when the radio-frequency coaxial connector assembly is subjected to the plug-in operation, even if the incomplete plug-in phenomenon exists in the radio-frequency plugs 10 and the radio-frequency sockets 50 in several radio-frequency coaxial connectors, as long as the error is less than 3 mm, the impedance change is very small, and the signal transmission is almost undisturbed, such that multiple times of subsequent debugging, adjustment, and re-plugging operations are unnecessary to be performed. Not only the operation is convenient, but also the damage to signal transmission is not easy to be caused. The radio-frequency coaxial connector of the present application has broad application prospects and important application value in high-tech fields, such as electronic information.

The fixing assembly is of a simple structure and convenient to use. After the fixing plug 3 and the fixing socket 2 are plugged in, the fixing plug 3 and the fixing socket 2 are in a locked state, and the fixing plug 3 and the fixing socket 2 are not easily separated from each other, and the plug-in quality is high. When the radio-frequency socket 50 and the radio-frequency plug 10 are plugged in, the separation between the radio-frequency socket 50 and the radio-frequency plug 10 can be effectively avoided, ensuring that the radio-frequency socket 50 and the radio-frequency plug 10 are always in a complete plug-in state.

As for separating the fixing plug 3 and the fixing socket 2, which are plugged-in, it is necessary to use a sleeve matching with the third mounting hole 23 and the elastic sheets 34 to insert the sleeve into the third mounting hole 23 and force the elastic sheets 34 to be retracted so as to reduce the value of a, and finally enable the elastic sheets 34 to pass through the second mounting hole 22 again.

The locking structure between the fixing plug 30 and the fixing socket 20 for locking the radio-frequency socket 50 is composed of a convex plate 32, a bump 33, an elastic sheet 34, a third mounting hole 23, a convex structure 221. Due to the fixing of the fixing assembly, it is made to be difficult to separate the radio-frequency socket 50 and the fixing socket 20. After the radio-frequency socket 50 and the radio-frequency plug 10 are plugged in, it is more difficult to cause the deviation.

The foregoing descriptions are merely preferred embodiments of the present application and are not intended to limit the present application. Any modifications, equivalent replacements and improvements made within the spirit and principle of the present application shall be included in the protection scope of the present application.

What is claimed is:

1. A high-fault-tolerance radio-frequency coaxial connector, comprising a radio-frequency plug, a radio-frequency socket coaxially arranged with the radio-frequency plug, and a fixing assembly for fixing the radio-frequency socket, wherein the radio-frequency plug and the radio-frequency socket are movably linked in a plug-in manner, wherein a plug-in structure between the radio-frequency plug and the radio-frequency socket is of an equal-interval arrangement; and the fixing assembly comprises a fixing plug and a columnar fixing socket, and a locking structure for locking the radio-frequency socket is arranged between the fixing plug and the fixing socket, wherein the radio-frequency plug comprises a tubular plug outer conductor, the plug outer conductor is provided therein with a plurality of first conductor plates along an axial direction of the plug outer conductor, an inside edge of each of the first conductor plates is integrally connected with the plug outer conductor, an outside edge of each of the first conductor plates is arranged inside the plug outer conductor, a second conductor plate is fixedly provided at a central axis of the plug outer conductor, a gap is provided between an outside wall of the second conductor plate and an inside wall of the plug outer conductor; and the radio-frequency socket comprises a tubular socket shell, and a first slot matched with the first conductor plate is provided at a front end of the socket shell, a tuning fork-shaped socket inner conductor is provided at a center axis of the socket shell, and a second slot matched with the second conductor plate is provided at a head end of the socket inner conductor.

2. The high-fault-tolerance radio-frequency coaxial connector according to claim 1, wherein the first conductor plates are set in number of two, and central axes of the two first conductor plates and a central axis of the second conductor plate are coplanar with each other.

3. The high-fault-tolerance radio-frequency coaxial connector according to claim 1, wherein a width direction of the second conductor plate and a width direction of the socket inner conductor are perpendicular to each other.

4. The high-fault-tolerance radio-frequency coaxial connector according to claim 1, wherein the fixing plug comprises an insulating tube body sleeved outside the socket inner conductor, a plurality of elastic sheets are provided outside of a middle section of the insulating tube body, a tail end of each of the elastic sheets and the insulating tube body are connected integrally, a spacing is provided between a head end of each of the elastic sheets and an outside wall of the insulating tube body, and an included angle between a length direction of the elastic sheets and a length direction of the insulating tube body is α, and α is an acute angle; a plurality of convex plates are provided at a rear section of the insulating tube body, head ends of the elastic sheets are arranged between tail ends of the elastic sheets and head ends of the convex plates, a bump is provided outside of the tail end of each of the convex plates, a spacing is provided between a front end of the bump and a head end of a corresponding convex plate; and a hole channel for allowing the radio-frequency socket to be installed is provided at a head end of the fixing socket, wherein the hole channel comprises a first mounting hole for allowing the bump to enter and exit, a second mounting hole for allowing the convex plates to enter and exit, and a third mounting hole adapted to the elastic sheets, a fourth mounting hole is provided at a tail end of the fixing socket, the second mounting hole is provided between the first mounting hole and the third mounting hole, the third mounting hole is in communication with the fourth mounting hole, aperture of the first mounting hole is larger than that of the second mounting hole, and aperture of the third mounting hole is larger than that of the second mounting hole.

5. The high-fault-tolerant radio-frequency coaxial connector according to claim 4, wherein value of α satisfies 6°≤α≤30°.

6. The high-fault-tolerance radio-frequency coaxial connector according to claim 4, wherein two bumps are provided, two convex plates are provided, and two elastic sheets are provided, wherein a plane where the two bumps are located is coplanar with a plane where the two convex plates are located, and the plane where the two convex plates are located is coplanar with a plane where the two elastic sheets are located.

7. The high-fault-tolerance radio-frequency coaxial connector according to claim 1, wherein number of the first conductor plates is at least three, and the first conductor plates are symmetrically arranged inside a plug shell.

8. A high-fault-tolerance radio-frequency coaxial connector assembly, comprising a plurality of high-fault-tolerance radio-frequency coaxial connectors according to claim 1, wherein the high-fault-tolerance radio-frequency coaxial connectors are arranged in an array.

* * * * *